(12) United States Patent
Kato et al.

(10) Patent No.: US 9,000,619 B2
(45) Date of Patent: Apr. 7, 2015

(54) ANTENNA APPARATUS

(75) Inventors: Noboru Kato, Kyoto-fu (JP); Katsumi Taniguchi, Kyoto-fu (JP); Jun Sasaki, Kyoto-fu (JP); Naoki Gouchi, Kyoto-fu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/277,758

(22) Filed: Oct. 20, 2011

(65) Prior Publication Data

US 2012/0091821 A1    Apr. 19, 2012

Related U.S. Application Data

(63) Continuation of application No. PCT/JP2010/056003, filed on Apr. 1, 2010.

(30) Foreign Application Priority Data

Apr. 21, 2009   (JP) .................................. 2009-103358

(51) Int. Cl.
| | |
|---|---|
| *H01F 38/14* | (2006.01) |
| *H01Q 19/02* | (2006.01) |
| *H01Q 1/38* | (2006.01) |
| *H01Q 7/00* | (2006.01) |

(Continued)

(52) U.S. Cl.
CPC ................. *H01Q 19/02* (2013.01); *H01Q 1/38* (2013.01); *H01Q 7/00* (2013.01); *H01Q 7/04* (2013.01); *H04B 5/0081* (2013.01); *H01P 11/001* (2013.01); *H01Q 1/22* (2013.01); *H01Q 1/36* (2013.01); *H01Q 7/06* (2013.01); *H01P 11/00* (2013.01); *H01Q 1/2225* (2013.01); *H01Q 1/48* (2013.01); *H01Q 1/52* (2013.01); *H01Q 19/062* (2013.01); *G06K 19/07779* (2013.01)

(58) Field of Classification Search
USPC ......................................................... 307/104
See application file for complete search history.

(56) References Cited

U.S. PATENT DOCUMENTS

| | | | |
|---|---|---|---|
| 5,229,652 A * | 7/1993 | Hough ........................... | 307/104 |
| 6,452,563 B1 | 9/2002 | Porte | |

(Continued)

FOREIGN PATENT DOCUMENTS

| | | |
|---|---|---|
| CN | 1336022 A | 2/2002 |
| CN | 101276959 A | 10/2008 |

(Continued)

OTHER PUBLICATIONS

Machine translations for JP 2005-204038, 11-25244, and 2006-39947.*

(Continued)

*Primary Examiner* — Fritz M Fleming
(74) *Attorney, Agent, or Firm* — Keating & Bennett, LLP

(57) ABSTRACT

There is provided an antenna apparatus. A magnetic flux passing through a coil aperture of an antenna coil passes through a conductor aperture of a conductive layer, but the magnetic flux does not pass through the conductive layer. Accordingly, the magnetic flux is diverted to a path in which the conductor aperture of the conductive layer is the inside and the outer edge of the conductive layer is the outside. As a result, the magnetic flux passing through the coil aperture of the antenna coil makes a relatively large loop and links the inside and the outside of a coil conductor in an antenna in a communication partner with the antenna apparatus.

13 Claims, 10 Drawing Sheets

(51) Int. Cl.
- *H01Q 7/04* (2006.01)
- *H04B 5/00* (2006.01)
- *H01P 11/00* (2006.01)
- *H01Q 1/22* (2006.01)
- *H01Q 1/36* (2006.01)
- *H01Q 7/06* (2006.01)
- *H01Q 1/48* (2006.01)
- *H01Q 1/52* (2006.01)
- *H01Q 19/06* (2006.01)
- *G06K 19/077* (2006.01)

(56) References Cited

U.S. PATENT DOCUMENTS

| | | | |
|---|---|---|---|
| 7,830,311 | B2 | 11/2010 | Kataya et al. |
| 8,590,797 | B2 * | 11/2013 | Kato et al. .................. 235/492 |
| 2002/0053992 | A1 | 5/2002 | Kawakami et al. |
| 2005/0125093 | A1 * | 6/2005 | Kikuchi et al. ............... 700/213 |
| 2009/0021446 | A1 | 1/2009 | Kataya et al. |

FOREIGN PATENT DOCUMENTS

| | | | |
|---|---|---|---|
| EP | 1 193 793 | A2 | 4/2002 |
| JP | 11-025244 | A | 1/1999 |
| JP | 2002-111363 | A | 4/2002 |
| JP | 2002-344225 | A | 11/2002 |
| JP | 2003-331250 | A | 11/2003 |
| JP | 2005-204038 | A | 7/2005 |
| JP | 2006-039947 | A | 2/2006 |
| JP | 2006-270681 | A | 10/2006 |
| JP | 2007-194961 | A | 8/2007 |
| JP | 2008-097473 | A | 4/2008 |
| JP | 2009-044715 | A | 2/2009 |
| WO | 89/07347 | A1 | 8/1989 |
| WO | 2007/138857 | A1 | 12/2007 |

OTHER PUBLICATIONS

Official Communication issued in corresponding European Patent Application No. 10766947.5, mailed on Oct. 24, 2013.
Official Communication issued in corresponding Japanese Patent Application No. 2011-510276, mailed on May 7, 2013.
International Search Report; PCT/JP2010/056003; Jul. 13, 2010.
Written Opinion of the International Searching Authority; PCT/JP2010/056003; Jul. 13, 2010.

* cited by examiner

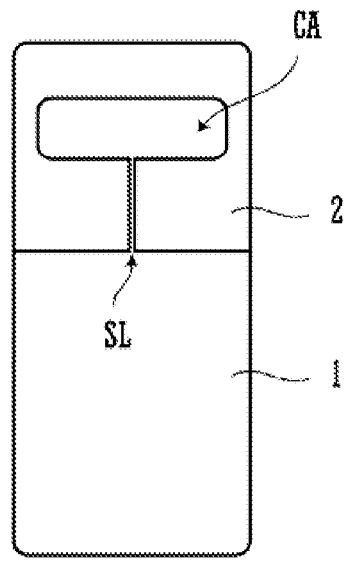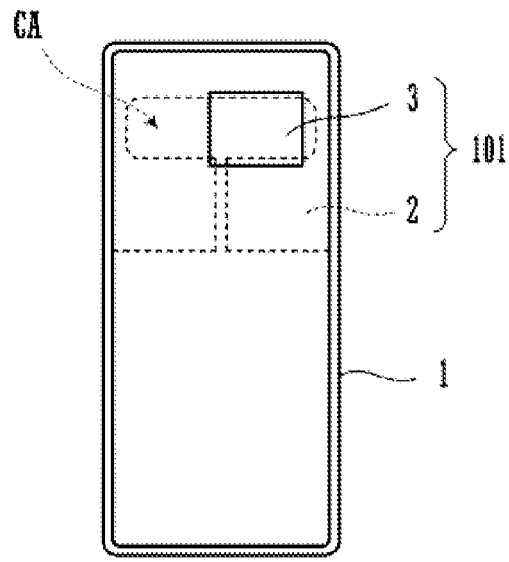
FIG.2A FIG.2B
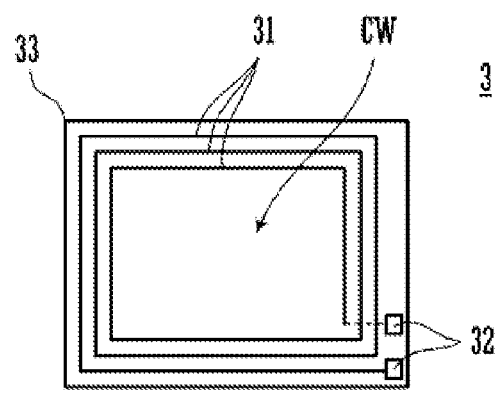
FIG.3A
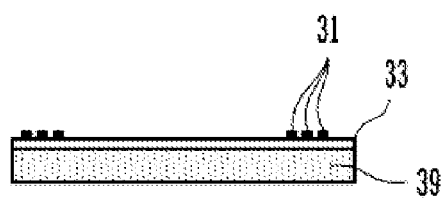
FIG.3B

… … …
ANTENNA APPARATUS

CROSS REFERENCE TO RELATED APPLICATIONS

The present application is a continuation of International Application No. PCT/JP2010/056003 filed Apr. 1, 2010, which claims priority to Japanese Patent Application No. 2009-103358 filed Apr. 21, 2009, the entire contents of each of these applications being incorporated herein by reference in their entirety.

TECHNICAL FIELD

The present invention relates to an antenna apparatus for use in an RFID system and a short-range wireless communications system that communicates with another apparatus using an electromagnetic signal.

BACKGROUND

In RFID systems and short-range wireless communication systems that have been increasingly used in recent years, in order to allow a mobile electronic apparatus such as a mobile telephone to communicate with another mobile electronic apparatus or a reader/writer, communication antennas are included in these mobile electronic apparatuses and the reader/writer. Japanese Unexamined Patent Application Publication No. 2006-270681 (Patent Document 1) discloses an antenna included in a mobile electronic apparatus.

FIG. 1 is a diagram illustrating a manner in which a mobile information terminal 21 and a reader/writer disclosed in Patent Document 1 communicate with each other when they are in close proximity to each other. In the example illustrated in FIG. 1, a part of a magnetic field H of an electromagnetic wave emitted from a transmission/receiving antenna portion 26 in the reader/writer is reflected or absorbed under the effect of a metal body, such as a battery pack 25 in a terminal body 22, and is attenuated. A metal layer 30 is provided so that it is nearer to an electromagnetic wave enter side than a communication surface CS of an antenna module 10. When an external magnetic field is applied to the surface of the metal layer 30, an induced current (eddy current) occurs on the surface of the metal layer 30 and a magnetic field H1 is generated. The magnetic field H1 generates an induced current at an antenna coil 15 in the antenna module 10.

In this example, by disposing the metal layer 30 so that it covers a part of the antenna coil 15 and faces the antenna module 10 in close proximity to the antenna module 10, the transmission/receiving antenna portion 26 in the reader/writer and the antenna coil 15 in the antenna module 10 are inductively coupled via the magnetic field component H1 generated at the metal layer 30.

SUMMARY

The present disclosure provides an antenna apparatus capable of stably communicating with a communication partner and increasing the maximum possible communication range even when an antenna included therein is relatively smaller than an antenna included in the communication partner.

In an aspect of the disclosure, an antenna apparatus includes a coil conductor including a coil aperture at a winding center of the coil conductor, a conductive layer including a conductor aperture and a slit for connecting the conductor aperture and an outer edge of the conductive layer, and a radiation plate. The coil conductor and the conductive layer are coupled to each other via an electromagnetic field. The conductive layer and the radiation plate are coupled to each other via an electromagnetic field or a magnetic field.

BRIEF DESCRIPTION OF DRAWINGS

FIG. 2A is a rear view of an electronic apparatus including an antenna apparatus according to a first exemplary embodiment. FIG. 2B is a plan view illustrating an internal configuration of a lower case on the side of a back surface.

FIG. 3A is a plan view of an antenna coil module 3. FIG. 3B is an elevational view of the antenna coil module 3.

FIG. 5 includes diagrams illustrating an antenna apparatus according to a second exemplary embodiment.

FIG. 6 includes plan views of an antenna apparatus 103 according to a third exemplary embodiment.

DETAILED DESCRIPTION

Figure 1:
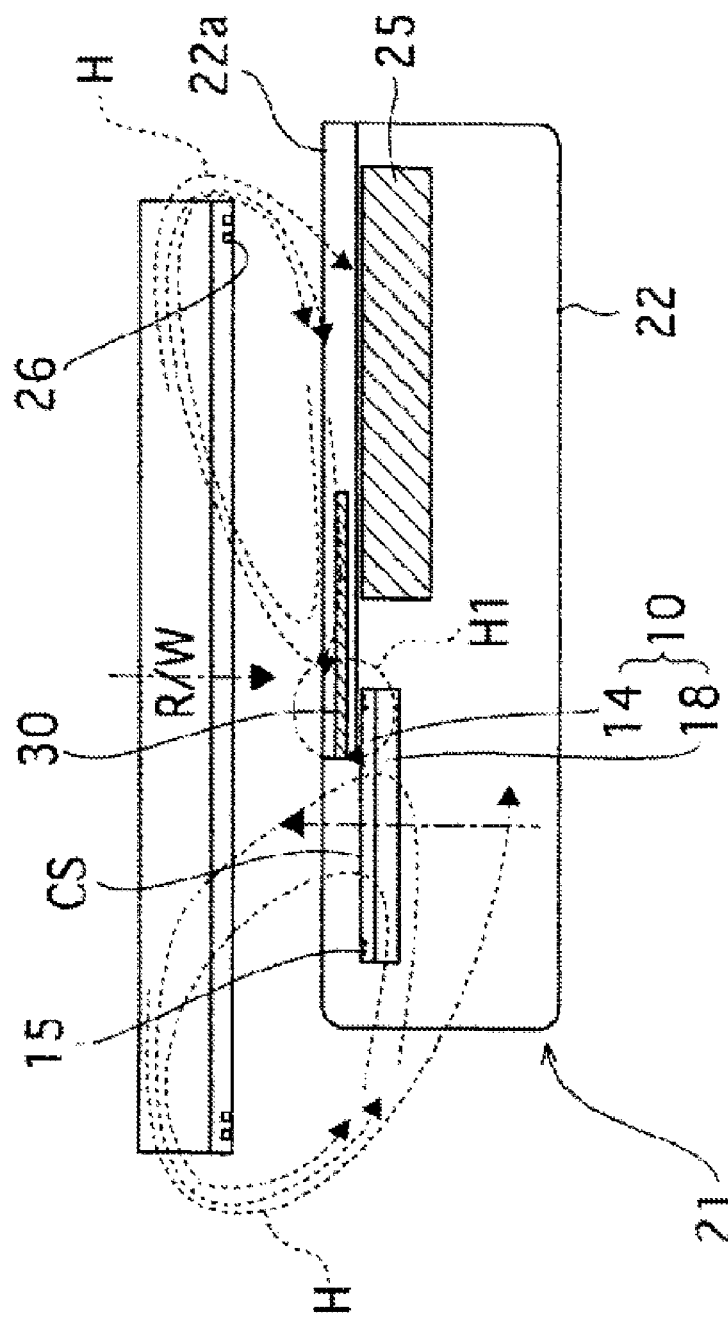
FIG. 1 is a diagram illustrating a manner in which a mobile information terminal 21 and a reader/writer disclosed in Patent Document 1 communicate with each other when they are in close proximity to each other.

The antenna apparatus illustrated in FIG. 1 solves a problem that a communication characteristic is markedly changed by a misalignment between the center of an antenna included therein and the center of an antenna included in a communication partner when the antenna apparatus and the communication partner are very close to each other. In order to prevent a magnetic flux to be linked to the antenna coil 15 in the antenna module 10 in the mobile information terminal 21 and the transmission/receiving antenna portion 26 in the reader/writer from being blocked by a metal body such as the battery pack 25, the metal layer 30 is disposed to induce the magnetic flux.

The inventors realized that, depending on the position of a blocker such as the battery pack 25, a significant effect may not be obtained by the metal layer 30. Furthermore, the metal layer 30 may not be effective in increasing a communication range when an antenna apparatus and an antenna included in a communication partner are apart from each other.

An antenna apparatus according to a first exemplary embodiment and a method of setting the resonant frequency of the antenna apparatus will be described with reference to FIGS. 2 to 4.

FIG. 2A is a rear view of an electronic apparatus including an antenna apparatus according to the first exemplary embodiment. The back surface of an electronic apparatus faces an antenna in a reader/writer that is a communication partner. FIG. 2B is a plan view illustrating an internal configuration of a lower case on the side of the back surface. In FIGS. 2A and 2B, the configuration of only a main part is illustrated.

As illustrated in FIG. 2A, on the outer surface of a lower case 1, a conductive layer 2 is formed. The conductive layer 2 is an evaporated metal film such as an aluminum film. A conductor aperture CA is formed in the conductive layer 2. Furthermore, a slit SL for connecting the conductor aperture CA and an outer edge is formed in the conductive layer 2.

As illustrated in FIG. 2B, on the inner surface of the lower case 1, an antenna coil module 3 is disposed so that it partly overlaps the conductor aperture CA.

In this example, a camera module is attached to the conductor aperture CA. It is necessary to expose the lens of a camera module at an opening of a case. By placing a conductor aperture at an opening of a case, it is not required to design a special case for the conductive layer 2.

When the outer surface of a case is partly made of metal for the purpose of design, a metal film is formed on the outer surface of the case by evaporation. The metal film may also be used as the conductive layer.

Thus, by forming the conductive layer 2 on the inner surface or the outer surface of a case of an electronic apparatus, the need to obtain special space for the disposition of the conductive layer 2 is eliminated and the conductive layer 2 having a large area can be provided.

FIG. 3A is a plan view of the antenna coil module 3. FIG. 3B is an elevational view of the antenna coil module 3. The antenna coil module 3 includes a rectangular plate-like flexible substrate 33 and a rectangular plate-like magnetic sheet 39. On the flexible substrate 33, a spiral coil conductor 31 including a coil window CW at a winding center and a connection portion 32 used for connection to an external circuit are formed. The magnetic sheet 39 can be, for example, a ferrite sheet.

The number of windings (turns) of the coil conductor 31 is determined in accordance with a required inductance. When the number of windings of the coil conductor 31 is one, the coil conductor 31 is a loop coil conductor.

As illustrated in FIG. 2B, the antenna coil module 3 is attached to the inner surface of the lower case 1 so that the connection portion 32 is connected to a predetermined pin on a circuit board attached to an upper case when the upper case is stacked on the lower case 1.

A capacitor to be connected in parallel to the connection portion 32 can be provided on the side of the circuit board. A resonant frequency is determined in accordance with an inductance determined by the coil conductor 31 and the magnetic sheet 39 in the antenna coil module 3 and the capacitance of the capacitor. For example, when the antenna coil module 3 is used in NFC (Near Field Communication: short-range communication) such as Felica (registered trademark) and the HF band having a center frequency of 13.56 MHz is used, the resonant frequency is set to 13.56 MHz.

Figure 4A:
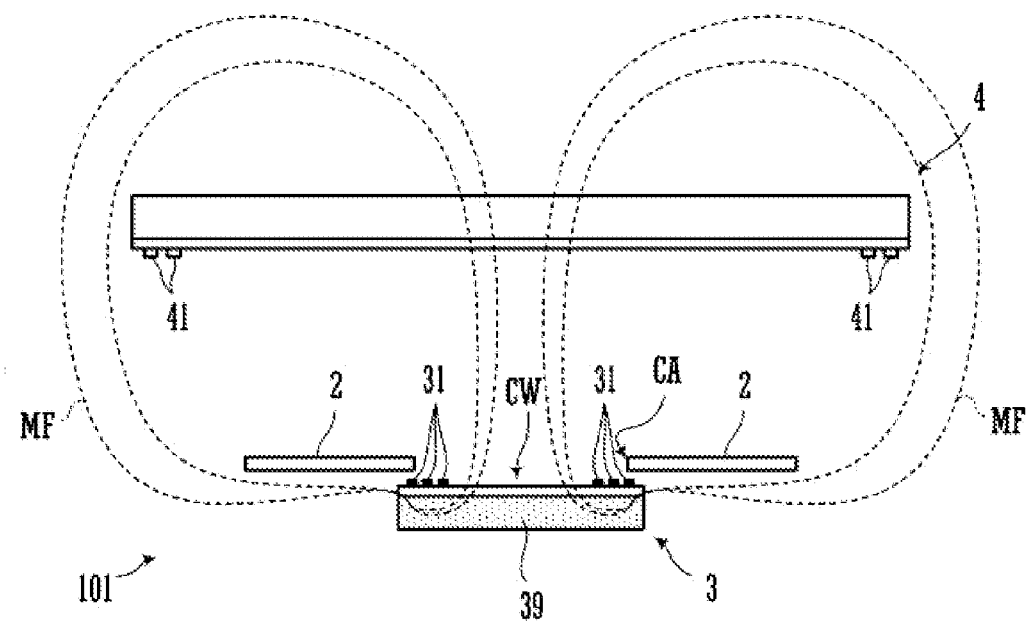
FIG. 4A is a cross-sectional view illustrating a manner in which an antenna apparatus 101 and an antenna in a reader/writer are magnetically coupled.
Figure 4B:
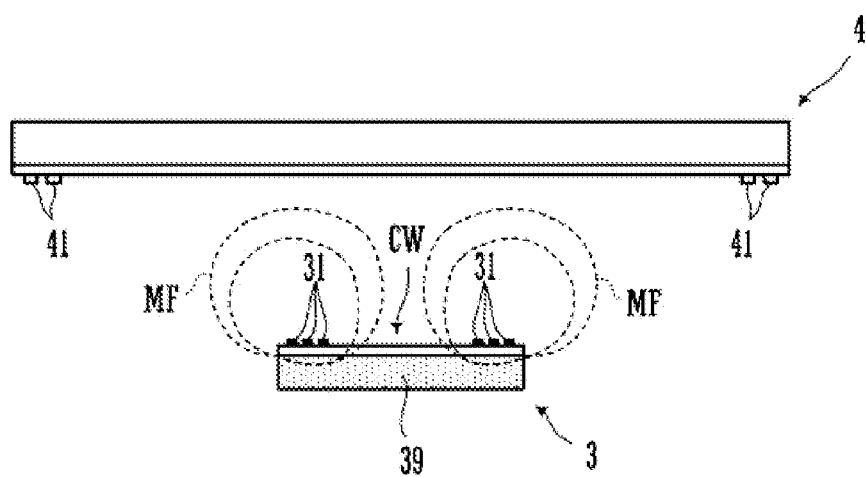
FIG. 4B is a cross-sectional view illustrating a comparative example in which the conductive layer 2 is not present.

FIG. 4A is a cross-sectional view illustrating a manner in which an antenna apparatus 101 and an antenna in a reader/writer are magnetically coupled. FIG. 4B is a cross-sectional view illustrating a comparative example in which the conductive layer 2 is not present. The illustration of a case of an electronic apparatus is not shown.

Since the coil conductor 31 in the antenna coil module 3 and the conductive layer 2 at least partly overlap, a current flows through the conductive layer so that a magnetic field generated by a current flowing through the coil conductor is blocked. That is, the coil conductor 31 and the conductive layer 2 are coupled via an electromagnetic field. A current flowing around the aperture of the conductive layer 2 passes through the periphery of the slit and flows along the periphery of the conductive layer 2 by the edge effect. The current also flows through a plane portion of the conductive layer. As a result, a magnetic field is generated at the conductive layer 2. On the other hand, no magnetic flux passes through the conductive layer 2. Accordingly, a magnetic flux MF is diverted to a path in which the conductor aperture CA of the conductive layer 2 is the inside and the outer edge of the conductive layer 2 is the outside. As a result, the magnetic flux MF makes a relatively large loop and links the inside and the outside of a coil conductor 41 in an antenna 4 in the reader/writer. That is, the antenna apparatus 101 and the antenna 4 in the reader/writer are magnetically coupled.

It is preferable that the coil conductor 31 and the conductive layer 2 at least partly overlap, although they may not overlap. For instance, even when the coil conductor 31 and the conductive layer 2 do not overlap, they can be coupled via an electromagnetic field.

Since the coil window CW and the conductor aperture CA at least partly overlap in plan view of the coil conductor 31, a magnetic flux to be linked to the coil conductor 31 and an antenna in a communication partner can circulate through the coil window CW and the conductor aperture CA. In particular, when the circumferences of the coil window CW and the conductor aperture CA almost overlap in plan view of the coil conductor 31, a magnetic field generated by the coil conductor 31 can be effectively emitted.

Since the conductive layer 2 has an area larger than that of a region in which the coil conductor 31 is formed, a large magnetic field loop can be made.

Since the magnetic sheet 39 is laminated on one of surfaces of the flexible substrate 33 which is farther from an antenna in a communication partner than the other surface, the directivity of an antenna in a direction in which the communication partner is present can be increased.

Thus, a magnetic flux points in a direction in which the conductive layer 2 extends. Accordingly, even when the antenna apparatus 101 (the antenna coil module 3) and the antenna 4 in the reader/writer whose centers are on the same axis are disposed in close proximity, stable communication between them can be achieved.

Since the slit SL is formed in the conductive layer 2, no conductor loop is formed at the conductive layer 2. Accordingly, the generation of an eddy current at the conductive layer 2 can be prevented when the magnetic flux MF circulates through the conductor aperture CA and the outer edge of the conductive layer 2 as illustrated in FIG. 4A and a loss caused by an eddy current can be therefore reduced. As a result, it is possible to obtain the maximum possible communication range between the antenna apparatus 101 and the antenna 4 in the reader/writer.

Since a current is concentrated at an open end created by the slit SL of the conductive layer 2 and a potential difference occurs, the strength of a magnetic field becomes high around the slit SL. Accordingly, directivity toward the open end of the slit SL as viewed from the conductor aperture CA occurs. A communication range in a direction from the center of the conductor aperture CA to the open end created by the slit SL is increased. For example, in FIG. 2, a communication range in the direction from top to bottom is increased. Thus, it is possible to control directivity and a communication range by changing a position at which the slit SL is formed. In the following embodiments, this effect can also be obtained.

In contrast, as illustrated in FIG. 4B, when the conductive layer 2 is not present, the magnetic flux MF passing through the coil window CW does not extend in a horizontal direction in FIG. 4B (a direction in which the antenna coil module 3 extends in plan view of the antenna coil module 3) and the amount of coupling between the magnetic flux MF and the antenna 4 in the reader/writer is small. Accordingly, a phenomenon occurs in which a communication state becomes unstable when the magnetic flux MF and the antenna 4 in the reader/writer are in close proximity.

In an antenna apparatus according to the present disclosure, since a conductive layer generates the large loop of a magnetic flux, a magnetic flux from the antenna apparatus reaches an antenna in a communication partner or a magnetic flux from the antenna in the communication partner reaches the antenna apparatus. The maximum possible communication range between the antenna apparatus and the antenna in the communication partner is therefore increased.

The following table indicates results of measurement of a distance range in which the antenna apparatus 101 including the antenna coil module 3 and an antenna in a communication partner can communicate with each other when the size of the antenna coil module 3 is changed.

TABLE

| Size of Antenna Coil Module | No Conductive Layer | With Conductive Layer |
| --- | --- | --- |
| 22.5 mm × 20 mm | 0 to 24 mm | 0 to 44 mm |
| 22.5 mm × 19 mm | 0 to 23 mm | 0 to 43 mm |
| 22.5 mm × 18 mm | 0 to 19 mm | 0 to 41 mm |
| 22.5 mm × 17 mm | — | 0 to 39 mm |
| 22.5 mm × 16 mm | — | 0 to 38 mm |

For example, in the case of an antenna apparatus including the antenna coil module 3 with a size of 22.5 mm×18 mm, the maximum possible communication range is increased to 41 mm using a conductive layer from 19 mm obtained with no conductive layer. For example, in the case of an antenna apparatus including the antenna coil module 3 with a size equal to or smaller than 22.5 mm×17 mm, the antenna apparatus cannot perform communication when a conductive layer is not present. On the other hand, when a conductive layer is present, even in the case of an antenna apparatus including the antenna coil module 3 with a very small size of, for example, 22.5 mm×16 mm, the antenna apparatus can perform communication in the wide range of 0 mm to 38 mm.

The setting of the center frequency of the antenna apparatus 101 is performed as follows.

A resonant frequency in a state in which the antenna coil module 3 illustrated in FIG. 2B is not close to the conductive layer 2, that is, the antenna coil module 3 is not attached to the lower case 1 (but is connected in parallel to a resonance capacitor), is set to a frequency lower than the center frequency in an operating frequency band in advance. When the antenna coil module 3 is in close proximity to the conductor aperture CA of the conductive layer 2 as illustrated in FIGS. 2B and 4A, the inductance value of the antenna coil module 3 is reduced and the resonant frequency of the antenna apparatus 101 is increased. Accordingly, the inductance value of the antenna coil module 3 is determined so that the resonant frequency of the antenna apparatus 101 is substantially equal to the center frequency in an operating frequency band after the antenna coil module 3 has been included in the case of an electronic apparatus and the antenna apparatus 101 has been formed.

The inductance of an antenna apparatus can be changed in accordance with the length and width of the slit SL. For example, if the size of the slit SL is increased, the reduction in an inductance value (the increase in a resonant frequency) can be suppressed when the conductive layer 2 is in close proximity to the antenna coil module 3. Accordingly, the length and width of the slit SL is set so that a desired inductance value can be obtained.

The inductance of an antenna apparatus is also changed in accordance with the positional relationship between the antenna coil module 3 and the conductive layer 2 and the shape and size of the conductor aperture CA of the conductive layer 2. Accordingly, the positional relationship between the antenna coil module 3 and the conductive layer 2 and the shape and size of the conductor aperture CA of the conductive layer 2 are set so that a desired inductance value can be obtained.

Thus, since a conductive layer expands the loop of a magnetic flux, the coil window CW of the coil conductor 31 may be reduced in size. In this case, an antenna coil module can be reduced in size. With the reduction in the size of the coil window CW, the number of turns of a coil can be increased and the range of inductance values that an antenna coil module can take can be increased. As a result, a resonant frequency can be easily set.

As described previously, in the present disclosure, a magnetic field emission pattern is changed by a conductive layer at an operating frequency using the fact that a magnetic field cannot enter a conductive layer.

Using the antenna apparatus 101 according to the present disclosure, stable communication between the antenna apparatus 101 and the antenna 4 in the reader/writer can be performed even when the sizes of the antenna apparatus 101 and the antenna 4 in the reader/writer are changed. That is, when the antenna 4 in the reader/writer is large, the conductive layer 2 generates the large loop of a magnetic flux and a magnetic flux from the antenna apparatus 101 reaches the antenna 101 in the reader/writer. When the antenna 4 in the reader/writer is small, the conductive layer 2 increases a distance that a magnetic flux can travel.

Figure 5A:
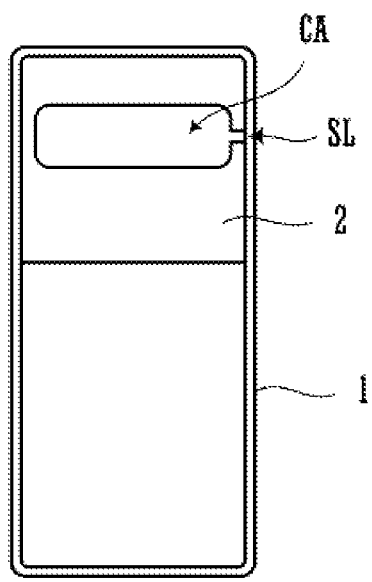
FIG. 5A is a plan view illustrating the inner surface of a lower case 1 of an electronic apparatus.
Figure 5B:
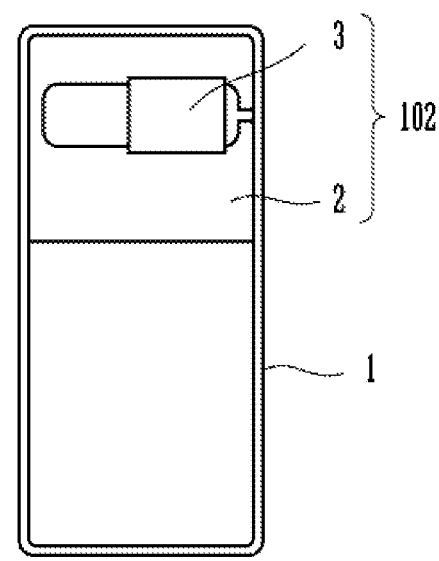
FIG. 5B is a plan view illustrating the inner surface of the lower case 1 to which the antenna coil module 3 is attached.

FIG. 5 includes diagrams illustrating an antenna apparatus 102 according to a second exemplary embodiment. FIG. 5A is a plan view illustrating the inner surface of the lower case 1 of an electronic apparatus. FIG. 5B is a plan view illustrating the inner surface of the lower case 1 to which the antenna coil module 3 is attached.

In the second exemplary embodiment, the conductive layer 2 is formed on the inner surface of the lower case 1. The conductive layer 2 is formed by evaporation of a metal film such as an aluminum film or the attachment of a metal foil. Thus, a conductive layer can be formed on the inner surface of a case.

In the example illustrated in FIG. 5, the slit SL of the conductive layer 2 has a short distance from the conductor aperture CA to an outer edge.

The conductive layer 2 can be connected to the ground in a circuit in an electronic apparatus. In this case, the conductive layer 2 can also function as a shielding conductive layer for the electronic apparatus.

Figure 6A:
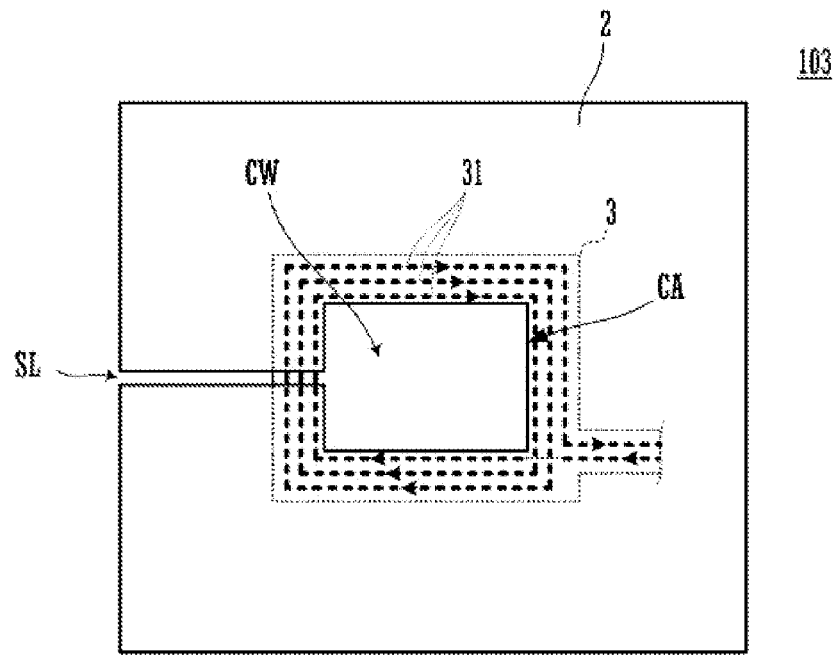
FIG. 6A illustrates a current flowing through the coil conductor 31.
Figure 6B:
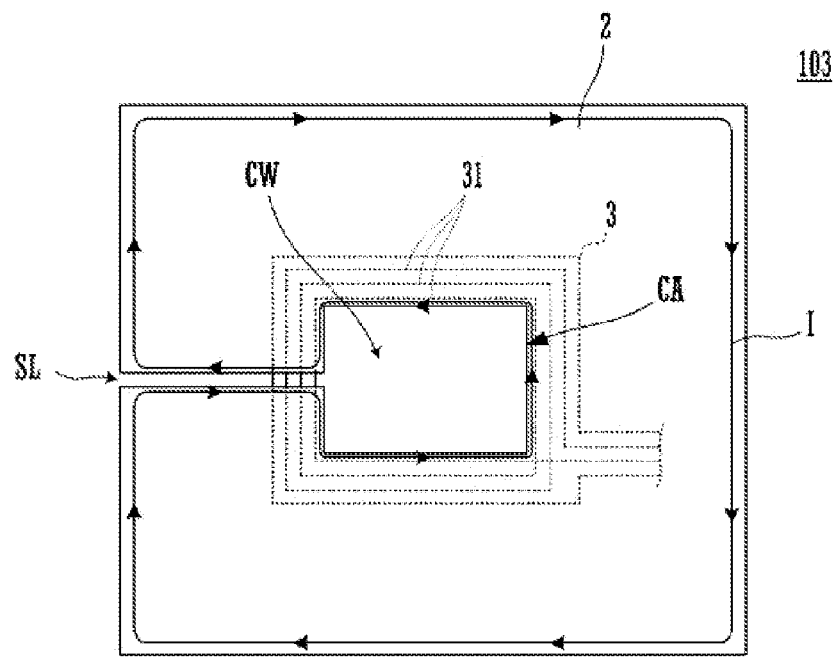
FIG. 6B illustrates a current I flowing through the conductive layer 2.

FIGS. 6A and 6B are plan views of an antenna apparatus 103 according to a third exemplary embodiment. FIG. 6A illustrates a current flowing through the coil conductor 31. FIG. 6B illustrates a current I flowing through the conductive layer 2. The antenna apparatus 103 includes the antenna coil module 3 and the conductive layer 2. The antenna coil module 3 is formed by laminating a flexible substrate on which the spiral coil conductor 31 is formed and a magnetic sheet, and is basically the same as the antenna coil module 3 illustrated in FIG. 3. In this example, however, both ends of the coil conductor extend from the flexible substrate and a connection portion is formed apart from the coil conductor 31.

The conductive layer 2 includes the conductor aperture CA and the slit SL that connects the conductor aperture CA and an outer edge.

The circumferences of the coil window CW and the conductor aperture CA almost overlap on the same axis in plan view of the coil conductor 31 and the conductive layer 2. Using this configuration, in plan view of the coil conductor 31, the coil conductor 31 can wholly overlap the conductive layer 2. As a result, since all of magnetic fluxes generated by the coil conductor 31 are to be linked to the conductive layer 2, a large current flows through the conductive layer 2 in a direction opposite to the direction of a current flowing through the coil conductor 31 so that these magnetic fluxes are blocked. The large current I flowing around the conductor aperture CA passes through the periphery of the slit SL, and flows through a plane portion of the conductive layer and along the periphery of the conductive layer by the edge effect. As a result, a strong magnetic field is generated at the conductive layer 2 and a communication range can be further increased. The loop of a magnetic flux flowing around the conductive layer 2 via the conductor aperture CA and the coil window CW is effectively expanded. Accordingly, even when an electronic apparatus including the antenna apparatus 103 is held over a reader/writer in any in-plane direction relative to a surface on which an antenna in the reader/writer is formed, stable communication between the electronic apparatus and the reader/writer can be achieved.

Figure 7A:
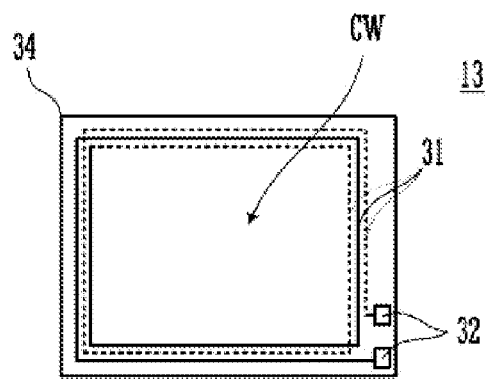
FIG. 7A is a plan view of an antenna coil module 13 according to a fourth exemplary embodiment.
Figure 7B:
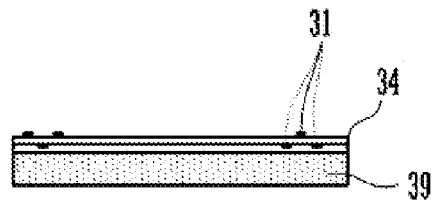
FIG. 7B is an elevational view of the antenna coil module 13.

FIG. 7A is a plan view of an antenna coil module 13 according to a fourth exemplary embodiment. FIG. 7B is an elevational view of the antenna coil module 13. Like in the first exemplary embodiment, the antenna coil module 13 is disposed in close proximity to the conductive layer illustrated in FIG. 2. By disposing the antenna coil module 13 in close proximity to the conductive layer 2, a large current is generated at the conductive layer 2 and a strong magnetic field is generated.

The antenna coil module 13 includes a rectangular plate-like flexible substrate 34 and the rectangular plate-like magnetic sheet 39. On the flexible substrate 34, the spiral coil conductor 31 including the coil window CW at a winding center and the connection portion 32 used for connection to an external circuit are formed. The coil conductor 31 is formed in two layers in the flexible substrate 34. These layers are connected to each other through a via conductor. The magnetic sheet 39 can be, for example, a ferrite sheet.

Thus, by winding the coil conductor 31 in a plurality of layers, a strong magnetic field is generated at the coil conductor. As a result, a large current can flow through the conductive layer. In addition, the coil conductor 31 can be concentrated along the inner edge of the conductor aperture CA. Accordingly, since concentrated magnetic fluxes generated at the coil conductor 31 are to be linked to the conductive layer 2, a large current can flow through the conductive layer 2.

Figure 8:
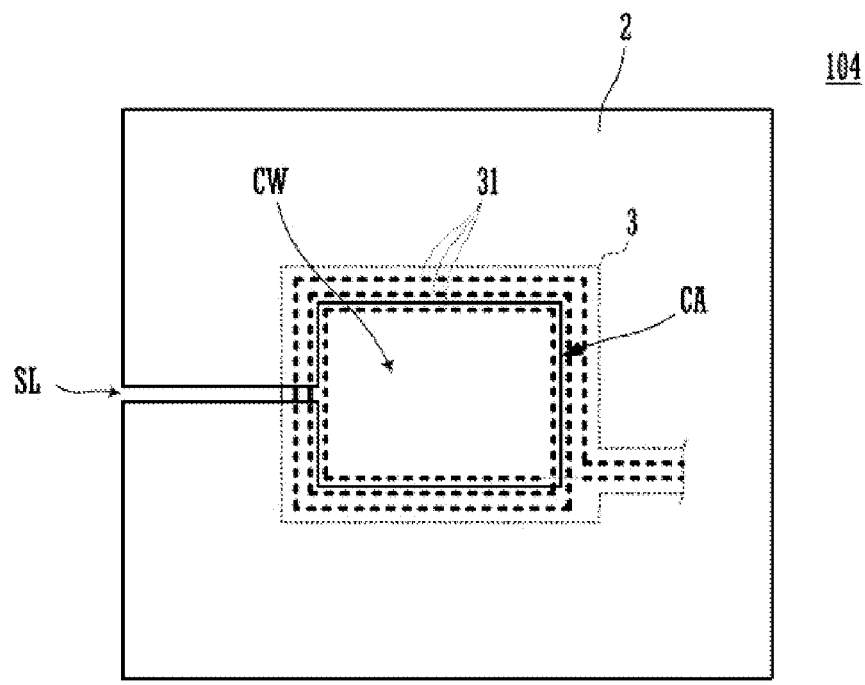
FIG. 8 is a plan view of an antenna apparatus 104 according to a fifth exemplary embodiment.

FIG. 8 is a plan view of an antenna apparatus 104 according to a fifth exemplary embodiment. The antenna apparatus 104 includes the antenna coil module 3 and the conductive layer 2. The antenna coil module 3 is formed by laminating a flexible substrate on which the spiral coil conductor 31 is formed and a magnetic sheet (not shown in FIG. 8). This configuration is similar to that illustrated in FIG. 6. In this example, however, the coil window CW is slightly smaller than the conductor aperture CA.

Since the coil conductor 31 partly overlaps the conductive layer 2, a current flows through the conductive layer 2 by a magnetic flux generated at the coil conductor 31.

Figure 9A:
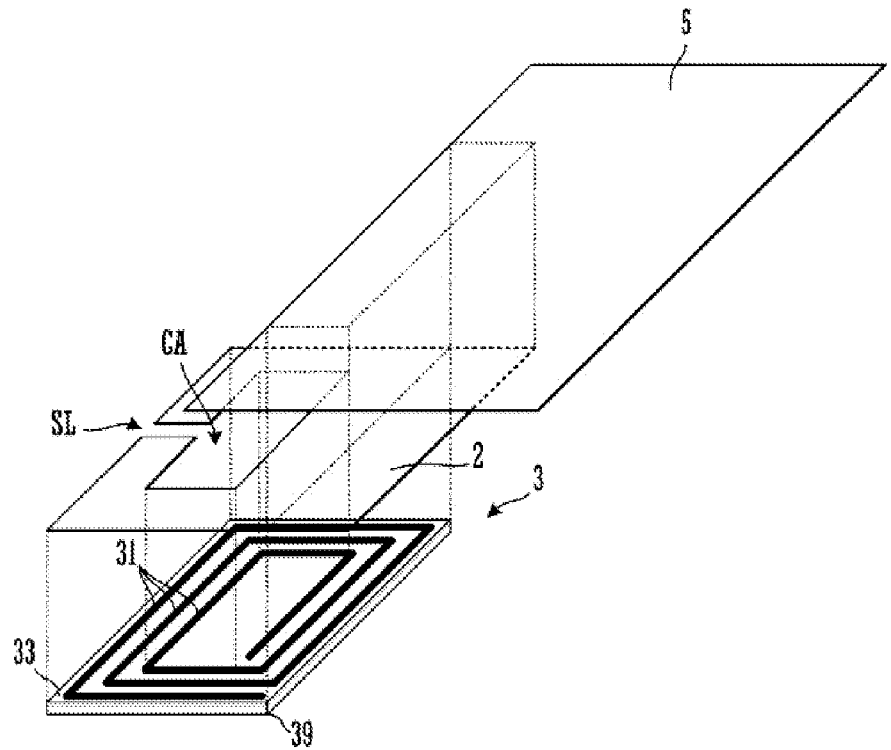
FIG. 9A is an exploded perspective view of an antenna apparatus according to a sixth exemplary embodiment.
Figure 9B:
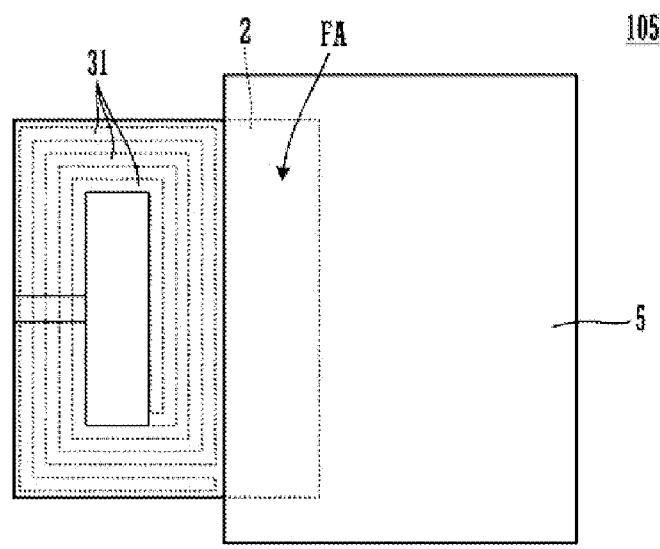
FIG. 9B is a plan view of an antenna apparatus 105.

FIG. 9A is an exploded perspective view of an antenna apparatus according to a sixth exemplary embodiment. FIG. 9B is a plan view of an antenna apparatus 105. The antenna apparatus 105 includes the antenna coil module 3, the conductive layer 2, and a radiation plate 5. The antenna coil module 3 is formed by laminating the flexible substrate 33 on which the spiral coil conductor 31 is formed and the magnetic sheet 39. The configuration of the antenna coil module 3 is basically the same as that illustrating in FIG. 3.

The conductive layer 2 and the radiation plate 5 are on planes substantially vertical to a winding axis of a coil conductor. The conductive layer 2 is formed in close proximity to the coil conductor 31, and the radiation plate 5 is disposed in close proximity to the conductive layer 2. The radiation plate 5 and the conductive layer 2 face each other with a predetermined gap therebetween or via an insulating layer or a dielectric layer. In plan view of the radiation plate 5, the radiation plate 5 and the conductive layer 2 overlap in a facing area FA.

The conductive layer 2 faces the coil conductor 31 and the radiation plate 5. In plan view of the conductive layer 2, the conductive layer 2 has a conductor region almost covering the coil conductor 31, and includes the conductor aperture CA that is a nonconductive portion overlapping an opening of the coil pattern 31 and the slit SL connected to the conductor aperture CA. As described previously, the conductive layer 2 partly overlaps the radiation plate 5 in plan view thereof. It is preferable that the radiation plate 5 does not overlap the conductor aperture CA or the slit SL of the conductive layer 2. When the radiation plate 5 does not overlap the conductor aperture CA or the slit SL of the conductive layer 2, a strong magnetic field around the slit SL is not blocked and a communication range can be ensured. It is desired that the radiation plate 5 be disposed apart from the slit SL with the conductor aperture CA between the radiation plate 5 and the slit SL.

Thus, when the radiation plate 5 partly overlaps the conductive layer 2 in plan view, the conductive layer 2 and the radiation plate 5 are strongly coupled to each other by electromagnetic field coupling or magnetic field coupling.

The coil conductor 31 is coupled not only to the radiation plate 5 by magnetic field coupling but also to the radiation plate 5 by electromagnetic field coupling or magnetic field coupling. Accordingly, the radiation plate 5 improves energy transmission efficiency.

Figure 10:
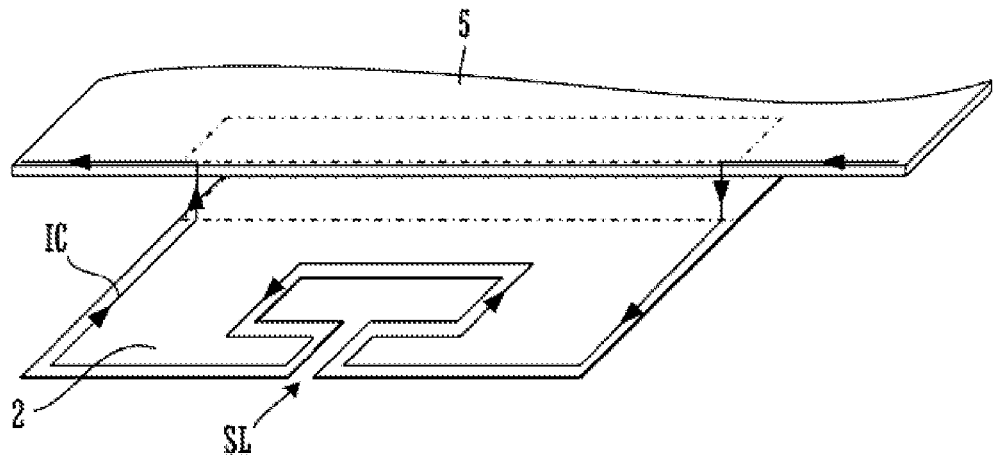
FIG. 10 illustrates an induced current flowing through the conductive layer 2 and the radiation plate 5 in the antenna apparatus 105 illustrated in FIG. 9.

FIG. 10 illustrates an induced current flowing through the conductive layer 2 and the radiation plate 5 in the antenna apparatus 105 illustrated in FIGS. 9A and 9B. Referring to FIG. 10, a straight-line arrow IC schematically represents the path of an induced current.

When high-frequency power (a high-frequency signal) is supplied to a terminal of a coil conductor in a state in which the conductive layer 2 and the radiation plate 5 face each other, an induction magnetic field is formed around the coil conductor. An induced current IC illustrated in FIG. 10 flows through a coupling region in the conductive layer 2 (a region where the conductive layer 2 is coupled to the coil conductor) by the induction magnetic field. That is, the coil conductor (not shown in FIG. 10) and the conductive layer 2 are coupled to each other by magnetic field coupling.

When the radiation plate 5 is not present, the induced current IC (that is, a signal current) flows around the edge portion of the conductive layer 2. In this example, since the radiation plate 5 is disposed near the conductive layer 2 and is coupled to the conductive layer 2, the induced current IC also flows through the radiation plate 5. The reason for this is that a signal current flows to a portion where a magnetic resistance is small. Accordingly, the signal current is transmitted to the radiation plate 5 having a large area, a region where the signal current flows is increased, and a region from which a magnetic field is emitted is increased. As a result, a communication range (reading distance) is increased.

In the sixth exemplary embodiment, a magnetic field is emitted mainly from the radiation plate 5, but is also emitted from the conductive layer 2 and the coil conductor.

Figure 11:
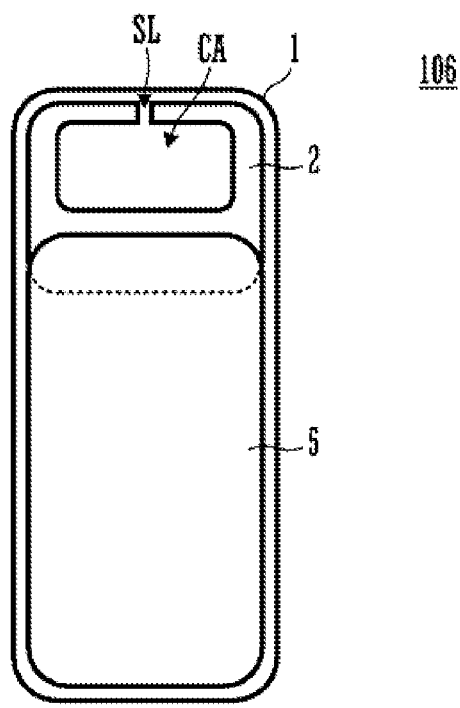
FIG. 11 is a plan view of an electronic apparatus including an antenna apparatus 106 according to a seventh exemplary embodiment.

FIG. 11 is a plan view of an electronic apparatus including an antenna apparatus 106 according to a seventh exemplary embodiment. In this example, the conductive layer 2 is formed inside the lower case 1 and the radiation plate 5 is formed on the outer surface of the lower case 1. In FIG. 11, a coil conductor is not illustrated. The relationship between a coil conductor and the conductive layer 2 is similar to that illustrated in FIGS. 9A and 9B.

By forming the radiation plate 5 on a case as described previously, special parts for holding the radiation plate 5 and special space for the radiation plate 5 are not needed and an electronic apparatus including an antenna apparatus can be reduced in size.

In this example, a radiation plate is formed on the outer surface of a case. A ground electrode on a circuit board can be used as the radiation plate. Alternatively, an electrode of a secondary battery included in the case or another metal component such as an exterior metal component can be used as the radiation plate. A coil conductor and a conductive layer may be integrated into a module.

In the seventh exemplary embodiment, the slit SL of the conductive layer forms an open end directed toward the top of the antenna apparatus 106. Therefore, a directivity characteristic in which a gain in an upward direction is high is obtained, and communication can be easily performed.

Figure 12:
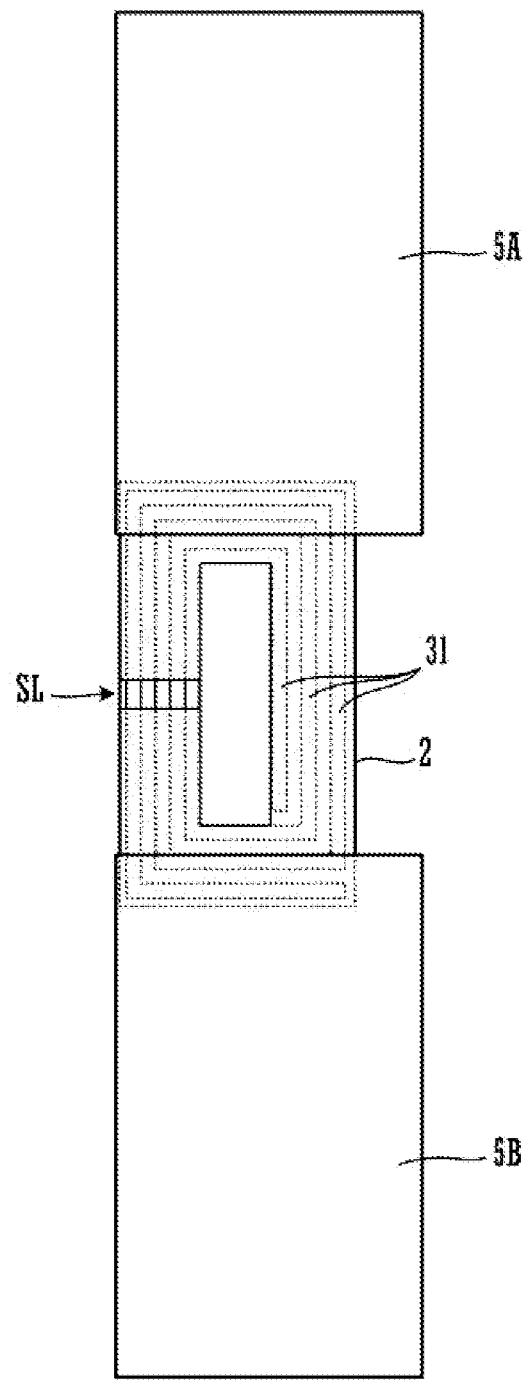
FIG. 12 is a plan view of an antenna apparatus 107 according to an eighth exemplary embodiment.

FIG. 12 is a plan view of an antenna apparatus 107 according to an eighth exemplary embodiment. The antenna apparatus 107 includes the coil conductor 31, the conductive layer 2, and radiation plates 5A and 5B. The relationship between the coil conductor 31 and the conductive layer 2 is similar to that illustrated in FIGS. 9A and 9B. The conductive layer 2 and the radiation plates 5A and 5B are on planes substantially vertical relative to a winding axis of the coil conductor 31. The conductive layer 2 is formed near the coil conductor 31, and the radiation plates 5A and 5B are disposed near the conductive layer 2. Each of the radiation plates 5A and 5B and the conductive layer 2 face each other with a predetermined gap therebetween. In plan view of the radiation plates 5A and 5B, the radiation plates 5A and 5B partly overlap the conductive layer 2.

Thus, a plurality of radiation plates, the radiation plates 5A and 5B, may be provided. The radiation plates 5A and 5B may overlap sides other than a side opposite a side at which the slit SL of the conductive layer 2 is formed (sides adjacent to the slit SL) in plan view.

Figure 13:
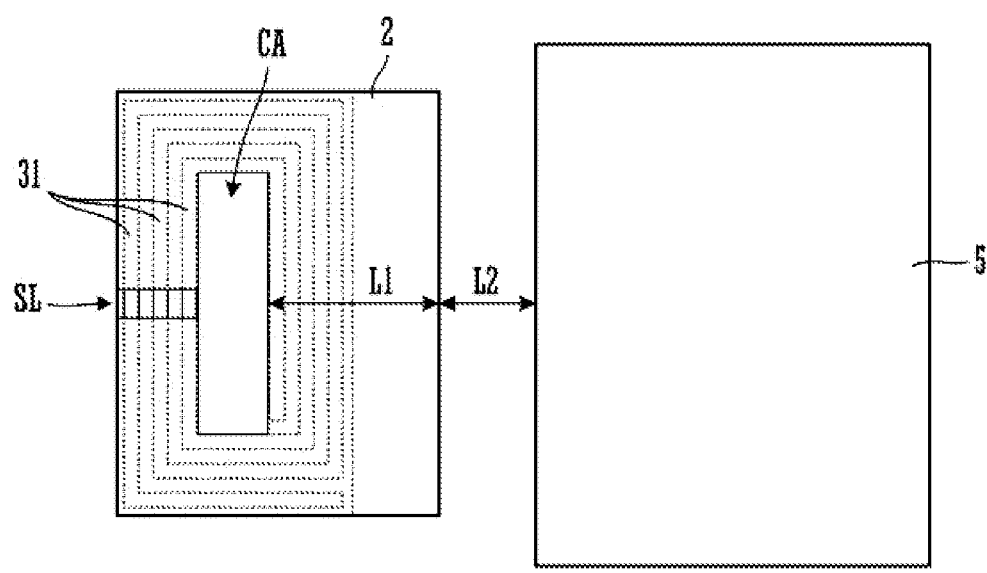
FIG. 13 is a plan view of an antenna apparatus 108 according to a ninth exemplary embodiment.

FIG. 13 is a plan view of an antenna apparatus 108 according to a ninth exemplary embodiment. The antenna apparatus 108 includes the coil conductor 31, the conductive layer 2, and the radiation plate 5. The conductive layer 2 and the radiation plate 5 are on planes substantially vertical relative to a winding axis of the coil conductor 31. The conductive layer 2 is formed near the coil conductor 31, and the radiation plate 5 is disposed near the conductive layer 2. The radiation plate 5 and the conductive layer 2 are disposed with a predetermined gap therebetween. In plan view of the radiation plate 5, the radiation plate 5 is disposed apart from the conductive layer 2 (i.e., they do not overlap in plan view).

Even when the radiation plate 5 and the conductive layer 2 are disposed with a predetermined gap therebetween as described previously, the conductive layer 2 and the radiation plate 5 are coupled by electromagnetic field coupling. It is assumed that the distance between the inner edge of the conductor aperture CA of the conductive layer 2 and the outer edge of the conductive layer 2 is L1 and the gap between the conductive layer 2 and the radiation plate 5 is L2. The larger the value of L2, the weaker the electromagnetic field coupling between the conductive layer 2 and the radiation plate 5. When $L1 \geq L2$ is satisfied, efficiency of transmitting power from the coil conductor 31 and the conductive layer 2 to the radiation plate 5 can be practically (substantially) ensured.

In the above-described embodiments, a conductive layer is nearer to an antenna in a communication partner than a coil conductor (i.e., on the side of the conductive layer closer to the antenna in a communication partner). The positions of the coil conductor and the conductive layer are not limited thereto. For example, as viewed from an antenna in a communication partner, a radiation plate, a coil conductor, and a conductive layer can be provided in this order.

In the above-described embodiments, a conductive layer and a radiation plate are formed on the outer surface or the inner surface of a case. The conductive layer and/or the radiation plate may be disposed inside the case. When the case is a metal case, the case can be used as the conductive layer and/or the radiation plate.

In some of the above-described embodiments, the antenna coil module 3 is obtained by laminating the flexible substrate 33 on which the coil conductor 31 is formed and the magnetic sheet 39, for example, made of ferrite. The magnetic sheet 39 may not necessarily be formed on the back surface of the antenna coil module 3 on the condition that the formation of a magnetic flux loop is not adversely affected by the absence of the magnetic sheet 39.

In embodiments consistent with the disclosure, a current flows through the conductive layer so that a magnetic field generated by a current flowing through the coil conductor is blocked. A current flowing around the aperture of the conductive layer passes through the periphery of the slit and flows along the periphery of the conductive layer by the edge effect. As a result, a magnetic field is generated at the conductive layer, and a communication range can be increased.

Since the conductive layer generates the large loop of a magnetic flux, a magnetic flux from the antenna apparatus reaches an antenna in a communication partner or a magnetic flux from the antenna in the communication partner reaches the antenna apparatus. The maximum possible communication range between the antenna apparatus and the antenna in the communication partner is therefore increased.

While exemplary embodiments have been described above, it is to be understood that variations and modifications will be apparent to those skilled in the art without departing from the scope and spirit of the disclosure.

The invention claimed is:

1. An antenna apparatus comprising:
   a coil conductor including a coil aperture at a winding center of the coil conductor;
   a conductive layer including a conductor aperture and a slit connecting the conductor aperture and an outer edge of the conductive layer; and
   a radiation plate; wherein
   the coil conductor and the conductive layer are configured to be coupled to each other via an electromagnetic field;
   the conductive layer and the radiation plate are configured to be coupled to each other via an electromagnetic field or a magnetic field;
   the conductive layer is provided on an inner surface or an outer surface of a case of an electronic apparatus into which the antenna apparatus is incorporated; and
   at least a portion of the conductive layer overlaps the radiation plate in a plan view of the radiation plate.

2. The antenna apparatus according to claim 1, wherein the coil aperture and the conductor aperture at least partly overlap in a plan view of the coil conductor.

3. The antenna apparatus according to claim 2, wherein the coil conductor and the conductive layer overlap in a plan view of the coil conductor.

4. The antenna apparatus according to claim 1, wherein the coil conductor and the conductive layer overlap in a plan view of the coil conductor.

5. The antenna apparatus according to claim 1, wherein the coil conductor and the conductive layer are disposed in close proximity to each other.

6. The antenna apparatus according to claim 1, wherein an area of the conductive layer is larger than that of a region where the coil conductor is disposed.

7. The antenna apparatus according to claim 1, wherein the coil conductor is wound in a plurality of layers.

8. The antenna apparatus according to claim 1, wherein circumferences of the coil aperture and the conductor aperture almost overlap in a plan view of the coil conductor.

9. The antenna apparatus according to claim 1, wherein the coil conductor is provided on a substrate, a magnetic sheet is laminated on one of surfaces of the substrate which is farther from an antenna in a communication partner than another surface of the substrate, and the substrate and the magnetic sheet form an antenna coil module.

10. The antenna apparatus according to claim 9, wherein the radiation plate faces the conductive layer, and the radiation plate partly overlaps the conductive layer in a plan view of the radiation plate.

11. The antenna apparatus according to claim 1, wherein the conductive layer and the radiation plate are configured to be coupled via an electromagnetic field or a magnetic field.

12. The antenna apparatus according to claim 1, wherein the coil conductor has one of a loop shape or a spiral shape.

13. The antenna apparatus according to claim 1, wherein another portion of the conductive layer does not overlap with the radiation plate in the plan view of the radiation plate.

* * * * *